United States Patent [19]

Ozeki et al.

[11] 4,341,687

[45] Jul. 27, 1982

[54] PEELABLE FILM-FORMING URETHANE/ISOCYANATE PAINTS

[75] Inventors: Kenichi Ozeki, Ichinomiya; Toyoji Wada, Nagoya; Kunio Ito, Aichi; Tetsuo Tomimori, Nagaokakyo; Isao Takagi; Mitsunobu Nekado, both of Kobe, all of Japan

[73] Assignee: Tokyo Shibaura Denki Kabushiki Kaisha, Kawasaki, Japan

[21] Appl. No.: 188,664

[22] Filed: Sep. 19, 1980

[30] Foreign Application Priority Data

Sep. 25, 1979 [JP] Japan .................................. 54-122895
Sep. 26, 1979 [JP] Japan .................................. 54-124500

[51] Int. Cl.³ ............................................. C08L 75/04
[52] U.S. Cl. .................................. 524/500; 427/393.5; 428/424.8; 525/457; 528/44; 528/49; 528/59; 524/539; 524/590

[58] Field of Search ............................. 528/49, 44, 59; 260/33.2 R; 427/393.5; 428/424.8; 525/457

[56] References Cited

U.S. PATENT DOCUMENTS

| | | | |
|---|---|---|---|
| 3,023,126 | 2/1962 | Underwood et al. | 428/424.8 |
| 3,678,011 | 7/1972 | Hino et al. | 528/49 |
| 3,718,712 | 2/1973 | Tushaus | 525/457 |
| 3,740,254 | 6/1973 | Lansburg et al. | 525/457 |
| 3,763,110 | 10/1973 | Oertel et al. | 525/457 |

*Primary Examiner*—Maurice J. Welsh
*Attorney, Agent, or Firm*—Cushman, Darby & Cushman

[57] ABSTRACT

A peelable film-forming paint is disclosed which is used for removing contamination from and protecting the surface of equipment subject to contamination such as oil, and which contains film-forming components of a polyurethane resin and an isocyanate resin dissolved in a volatile solvent. Such a paint is also disclosed which further contains less than 15% by weight of ethylene glycol monoalkyl ether.

8 Claims, 2 Drawing Figures

PEELABLE FILM-FORMING URETHANE/ISOCYANATE PAINTS

BACKGROUND OF THE INVENTION

The present invention relates to a peelable film-forming paint used for easy removal from equipment which is subject to contamination.

In various pieces of equipment such as blowers, electrical machinery, attachments for instruments, and especially in ventilation fans used in a kitchen or the like, the components such as the blades driven by the motor tend to become contaminated with dust and oil such as the oil scattered during cooking. Cleaning of such contamination has conventionally presented a problem. Thus, it has been recently proposed to coat a peelable film-forming paint (to be referred to as a paint for brevity hereinafter) which contains, for example, a polyurethane resin as a film-forming resin so as to cover the desired surface with a peelable film (to be referred to as a film for brevity hereinafter). With such a paint, the film alone is contaminated and the surface of the component of the equipment is not contaminated. The contamination on the formed film may be easily removed by peeling off the film, so that cleaning is made extremely simple. However, with the film formed by the above-mentioned paint, the adhesion of the film to the polypropylene generally used to mold the components of the ventilation fans and so on is weak, so that the film may be peeled off by contact with packing material while being transported. Further, with films formed with the conventional paint, the oil gradually permeates into the film to swell it and degrades the film after a short period of time. After the film has become swollen, it becomes very difficult to peel off the film; therefore, this must be performed before the film is swollen with the oil. Thus, with the conventional film which is not oil resistant and which easily swells with the oil attached thereto after a short period of time, the film must be peeled off a short period of time after the formation of the film, and a new film must be formed.

SUMMARY OF THE INVENTION

The present invention has been made to eliminate these problems and has for its object to provide a peelable film-forming paint for forming a peelable painted film on the surface of an equipment component, which adheres suitably to the component so that it may not be easily peeled off when lightly rubbed, and which provides sufficient oil resistance so that the oil attached to the film may not permeate into the film for swelling and degrading it after a short period of time, thereby providing a peelable film which is capable of withstanding use over an extended period of time.

To the above and other ends, the present invention provides a peelable film-forming paint characterized by mixing film-forming components of a polyurethane resin and an isocyanate resin in a volatile solvent.

The present invention further provides, in another aspect, said peelable film-forming paint which contains less than 15% by weight of ethylene glycol monoalkyl ether based on the total content of the film-forming resin components.

DETAILED DESCRIPTION OF THE DRAWINGS

The paint containing a polyurethane resin as a film-forming resin is good in peeling ability but presents problems in adhesion to a polypropylene resin. The present inventors thus have conducted tests and studied the problem from various aspects. As a result, it has been found that isocyanate resins show good adhesion to polypropylene resins and are miscible in polyurethane resins. Based on this finding, it has also been found that a film formed from a peelable film-forming paint containing as resin components a polyurethane resin and an isocyanate resin shows good adhesion to polypropylene resins. It has been further found that the oil resistance of the formed film is extremely improved when the amount of the isocyanate resin mixed in the paint is above a certain amount. It has also been found that the oil resistance of the film can be improved by keeping the amount of ethylene glycol monoalkyl ether contained for improving the leveling of the film below a certain amount.

The polyurethane resin to be used in the present invention may include various kinds and preferably includes a linear polyurethane resin obtainable from a linear polyether, an aliphatic isocyanate, and an alycyclic isocyanate or a diamine.

The isocyanate resin to be used in the present invention may include various kinds and preferably includes hydroxytoluene diisocyanate, hexamethylene diisocyanate, isophorone diisocyanate and so on.

The polyurethane resin and the isocyanate resin are used as dissolved in a volatile solvent such as a lower alcohol.

On the mixing ratio of the polyurethane resin and the isocyanate resin, it is preferable to mix 30-70% by weight of the isocyanate resin based on the amount of the polyurethane resin. When the amount of the isocyanate is less than 30% by weight, a sufficient peeling effect may not be obtained. When it exceeds 70% by weight, the drying of the formed film is not good, and the film surface shows unsuitable stickiness.

The amount of the ethylene glycol monoalkyl ether, that is, butyl cellosolve or ethyl cellosolve, must be less than 15% by weight of the total amount of the film-forming resins. When the amount of this cellosolve-based solvent is more than 15% by weight, the oil resistance is undesirably degraded. On the other hand, in order to obtain sufficient ease in painting the paint, the amount of the cellosolve-based solvent is preferably more than 5% by weight.

As other components of the peelable film-forming paint of the present invention, various additives which are conventionally used may be added such as an antioxidant, an ultraviolet absorbing agent, an antifoaming agent, a leveling agent and so on.

Figure 1:
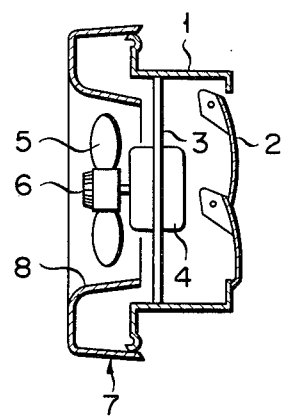
FIG. 1 is a sectional view of a ventilation fan.
Figure 2:
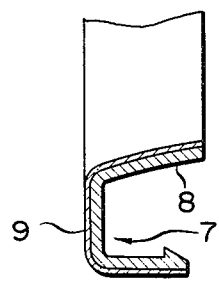
FIG. 2 is an enlarged partial sectional view of the ventilation fan shown in FIG. 1.

The peelable film-forming paint of the present invention can be applied to a kitchen ventilation fan as shown in FIG. 1. To describe the fan in more detail, numeral 1 denotes a body frame having a wind-pressure opening type shutter 2. A motor 4 is supported by a support 3 inside the frame 1. Blades 5 are detachably attached to the rotational axis of the motor 4 by a blade fastener 6. Numeral 7 denotes a surrounding frame which has an integrally formed bellmouth 8 surrounding the blades 5 and is detachably mounted to the body frame 1. Among these components, the blades 5, the blade fastener 6, and the surrounding frame 7, which are particularly exposed indoors are made of a plastic material such as a polypropylene resin. On the surface of these components, a film 9 is formed by spraying or by painting with a brush a peelable film-forming paint, as shown in an enlarged form in FIG. 2.

When the contamination such as oil has collected on the film 9 after use of the ventilation fan, the film 9 can be peeled off by hand so that the film and the contamination are removed together. After removing the film 9 in this manner, a peelable film-forming paint is painted on the predetermined portion of the ventilation fan exposed indoors, for repeated use.

EXAMPLE 1

As shown in Table 1, the mixing ratio of the isocyanate resin to the polyurethane resin which is the main constituent of the peelable film-forming paint was varied, and the amount of the ethylene glycol monoalkyl ether in the solvent relative to the total content of the dissolved resins (including both the polyurethane resin and the isocyanate resin) was also varied. The adhesion, stickiness and oil resistance were examined.

In the table, the numerals designate parts by weight unless otherwise indicated.

without the isocyanate resin, the film easily breaks when pressed lightly with a finger. With a paint which contains 30% isocyanate resin, the film does not peel off, even when the film is strongly pressed with a finger. When the adhesion of the paint is stronger than this, the defects such as separation of the film when rubbed with packing material during transportation can be entirely eliminated. When comparisons were made on the oil resistance with the paint containing 15% ethylene glycol monoalkyl ether, the film from the paint which did not contain any isocyanate resin at all become swollen in about a month. The film from the paint which contained 15% isocyanate resin became swollen in about two months. With the paint which contained 30% isocyanate resin, the film did not swell for about 6 months. With the paint which contained 70% isocyanate resin, it did not swell for over 6 months. With the paints which show such superior oil resistance, the peeling off and the repainting of the film need not be repeated in a short period of time, so that once the film is formed it may be conveniently used for an extended period of time until oil and dust have considerably collected on the surface of the film. However, with a paint which contained over 70% isocyanate resin, for example, over 85% isocyanate resin, the drying of the film was degraded, so that stickiness was noted on the surface of the film,

TABLE 1

| | | | | | | | | | |
|---|---|---|---|---|---|---|---|---|---|
| (a) | Polyurethane lacquer | 100 | 100 | 100 | 100 | 100 | 100 | 100 | 100 |
| (b) | Isocyanate prepolymer (% by weight based on polyurethane resin) | (0) | (15) | (15) | (30) | (30) | (70) | (85) | (58.3) |
| (c) | Ethylene glycol monoalkyl ether (% by weight based on aliphatic component) | (15) | (15) | (20) | (15) | (20) | (15) | (15) | (10.5) |
| (d) | Antioxidant | 1 | 1 | 1 | 1 | 1 | 1 | 1 | 1 |
| (e) | Ultraviolet absorbing agent | 0.2 | 0.2 | 0.2 | 0.2 | 0.2 | 0.2 | 0.2 | 0.2 |
| (f) | Solvent | 15 | 15 | 15 | 15 | 15 | 15 | 15 | 15 |
| | Adhesion | | | | | | | | |
| | Stickiness | | | | | | | | |
| | Oil resistance (month) | about 1 | about 2 | about 1 | about 6 | about 4 | over 6 | over 6 | over 6 |

(note)
(a) Linear polyurethane resin content 30% (Trade name, Olester NL-2249E, a product of Mitsuitoatsu Kagaku Co. Ltd.)
(b) Resin content 35% (Trade name, Polylex NY-35, a product of Daiichikogyo Seiyaku Co. Ltd.)
(c) Butyl cellosolve/ethyl cellosolve (10:15)
(d) 3,5-di-ter-butyl-4-hydroxytoluene
(e) Benzotriazole
(f) Isopropyl alcohol/methyl alcohol (4:1)

The adhesion here refers to the adhesion of the film to the components (made of a polypropylene resin) of the ventilation fan. A circle mark indicates that peeling of the film did not occur, even when pressed strongly by a finger. A triangle mark indicates that a slight crack was noted when the film was strongly pressed with the finger. An x mark indicates that a crack was noted when the film was lightly pressed with the finger. The stickiness here means the setting condition of the film after application of the paint upon drying for one hour at ordinary temperature. A circle mark indicates that no stickiness was noted at all even when the film was touched by a finger. A triangle mark indicates that slight stickiness was felt by the finger. An x mark indicates that the film was sticky to the finger. The oil resistance here is indicated by the period required for the film to swell when the ventilation fan with the film formed on its surface is used in a kitchen.

As is apparent from table 1, the adhesion and the oil resistance are improved when more isocyanate resin is mixed with the polyurethane resin. With a paint which contains, as resin components, the polyurethane alone resulting in inconvenience. Next, the amount of the isocyanate resin to be mixed in was made constant (15%, 30%), and the amount of ethylene glycol monoalkyl ether was varied from 15% to 20%. The film obtained with the former paint did not swell for a period of time equal to about 1.5-2 times the swelling time of the latter. From the various test results, it has been found that the oil resistance is improved when the amount of the isocyanate resin is 30-70%, and the amount of the ethylene glycol monoalkyl ether based on the dissolved resins is less than 15%.

According to the present invention, the paint for forming a peelable film when applied to the surface of equipment components is characterized by containing as the resin components a polyurethane resin and an isocyanate resin. As a result of this, the adhesion of the film is improved, suitable adhesion to the equipment components is obtained, and the defect of easy peeling of the film under light rubbing is eliminated. Further, since the amount of ethylene glycol monoalkyl ether in the solvent is made less than 15% by weight based on the film-forming dissolved resins, excellent oil resistance can be obtained in the film. The swelling and degradation of the film after a short period of time which may be caused by the attachment of oil is eliminated. Thus, a peelable film-forming paint is provided for forming peelable films which are capable of use over an extended period of time.

What is claimed is:

1. A peelable film-forming paint, comprising a mixture of a polyurethane resin, an isocyanate prepolymer and 15% by weight of ethylene glycol monoalkyl ether based on the total weight of said polyurethane resin and said isocyanate prepolymer.

2. A peelable film-forming paint as claimed in claim 1 wherein an amount of said isocyanate prepolymer is 30–70% by weight bsed on the weight of said polyurethane resin.

3. A peelable film-forming paint as claimed in claim 1 or 6 wherein said polyurethane resin is a linear polyurethane resin prepared from the reaction between a linear polyester and one member selected from the group consisting of an aliphatic isocyanate and an alicyclic isocyanate.

4. A peelable, oil-resistant, film-forming paint composition capable of being adhered to a polypropylene resin substrate, said paint composition prepared by mixing:
    (1) a film-forming polyurethane resin;
    (2) a film-forming isocyanate prepolymer present in an amount of from 30 to 70% by weight based on the weight of the polyurethane resin; and
    (3) ethylene glycol monoalkyl ether present in an amount of from 5 to 15% by weight based on the total amount of the film-forming components, together and dissolving the film-forming resins in a volatile solvent.

5. A peelable film-forming paint as claimed in claim 1 or 4 wherein said isocyanate prepolymer is selected from the group consisting of a hydrogenated toluene diisocyanate, hexamethylene diisocyanate and isophorone diisocyanate.

6. A polypropylene resin article coated with a film of the peelable, oil-resistant paint of claim 4.

7. A process of applying an oil-resistant peelable film to the surface of a polypropylene article comprising: (1) applying to said article a film-forming paint comprising a mixture of a polyurethane resin, an isocyanate prepolymer and 15% by weight of ethylene glycol monoalkyl ether based on the total weight of said polyurethane resin and isocyanate prepolymer; and (2) allowing the thus applied paint to dry forming an oil-resistant film on said article which is peelable therefrom.

8. The process as claimed in claim 7 including the additional step of: (3) peeling the dried film from the polypropylene article.

* * * * *